Oct. 9, 1962

L. J. VIERNSTEIN 3,058,051

SYNCHRO SWITCHED MAGNETIC AMPLIFIER

Filed Nov. 10, 1958

LAWRENCE J. VIERNSTEIN
*INVENTOR.*

BY Q. Baxter Warner
G. D. O'Brien
ATTORNEYS

United States Patent Office 3,058,051

Patented Oct. 9, 1962

3,058,051

SYNCHRO SWITCHED MAGNETIC AMPLIFIER

Lawrence J. Vierstein, Kensington, Md., assignor to the United States of America as represented by the Secretary of the Navy Filed Nov. 10, 1958, Ser. No. 773,120
3 Claims. (Cl. 323—89)

The present invention relates to magnetic amplifiers. More specifically it relates to improved amplifiers of the single core internal feedback type.

An amplifier of the single core internal feedback type is disclosed in U.S. Patent No. 2,783,315 to R. A. Ramey, Jr. for "Magnetic Amplifier Control Circuit." The Ramey circuit exhibits the advantages of rapid response to control current variation and exceptionally high power gain. It suffers, however, from the requirement that during the core reset operation the necessary magnetizing current must be dissipated in the circuit elements supplying the control voltage. Frequently the dissipation of power in the control voltage source is prohibited or restricted to such an extent that the otherwise satisfactory Ramey amplifier cannot be used.

It is therefore the principal object of the present invention to provide a magnetic amplifier in which control current flows in the same direction as the applied control voltage.

Another object of this invention is to provide a magnetic amplifier capable of functioning solely with direct current sources of power.

A further object of this invention is to provide a magnetic amplifier capable of rapid response and high power gain.

Other objects and many of the attendant advantages of this invention will readily be appreciated as the same becomes understood by reference to the following detailed description when considered in connection with the following drawings, wherein.

Figure 1:
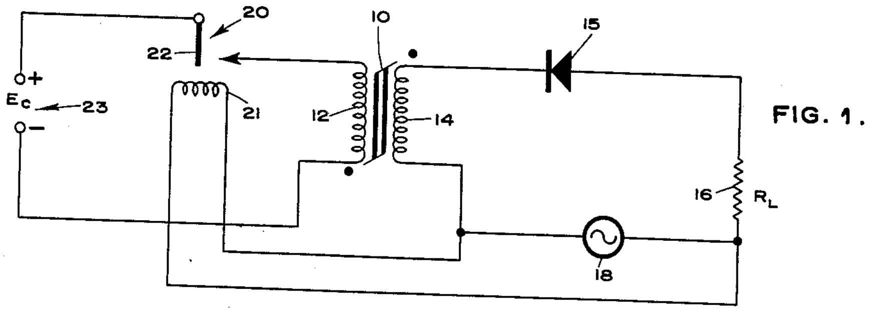
FIG. 1 is a schematic diagram of one embodiment of the present invention.

Referring to FIG. 1, the amplifier of the present invention comprises the usual saturable core 10 constructed of magnetic material having a square loop hysteresis characteristic with high remanence properties. The core 10 is preferably in the form of a toroid and has wound thereon a control winding 12 and a gate winding 14. The gate circuit includes a diode 15, a load 16, here represented by a resistor $R_L$, and an alternating current power source 18, all of which are connected in series with the gate winding 14. This much of the amplifier is found in the aforesaid Ramey amplifier and is also common to many other single core self-saturating circuits.

The control circuit includes a chopper 20 of the vibrating reed type driven from the power source 18 so as to maintain strict synchronism with the alternating current supply 18. Voltage applied to the driving coil 21 of chopper 20 is phased with respect to power source 18 to cause the closure of contacts 22 during the alternate half-cycles in which current flow in gate winding 14 is blocked by diode 15. Thus, during the non-conducting half-cycle of the gate winding, the control winding is connected to a source of direct voltage of the polarity indicated at terminals 23. The control voltage then operates to reset the magnetization in core 10 to a level appropriate for the control voltage magnitude. During the reset operation no current is flowing in gate winding 14 and consequently that winding exerts no effect on the core 10 which opposes the magnetization produced by the control current. Similarly, during conduction to the load, or the gating half-cycle, chopper 20 has opened contacts 22 thereby producing an open control circuit which has no inhibitory effect on the flow of load current. Response time to changes in control voltage equal to one-half cycle of the frequency of power source 18 is thus made available. Moreover it will be seen that the control current flows in a direction determined by the polarity of the control voltage source and not contrary thereto as occurs in the Ramey circuit.

Figure 2:
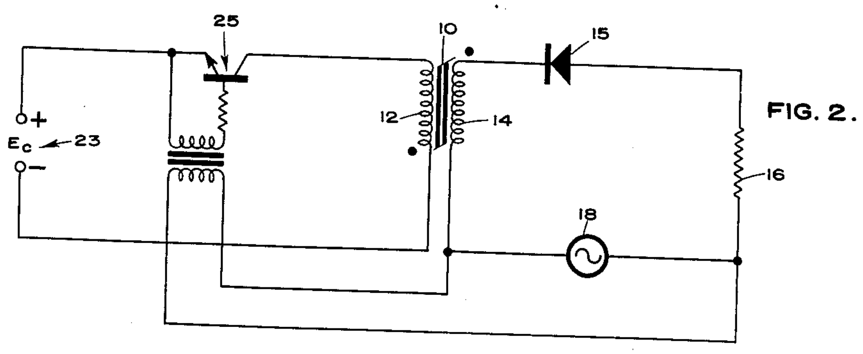
FIG. 2 is a schematic diagram of a modification of the amplifier of FIG. 1 wherein a transistor is employed as the synchronous switching element.

In FIG. 2 the amplifier circuit of FIG. 1 has been modified by the substitution of a transistor 25 for the chopper 20. The transistor 25 is driven from a conductive to a non-conductive state in synchronism with the power source 18 by the application of alternating voltage from a transformer 26 to the transistor base and emitter electrodes. The transistor 25 functions in a manner analogous to chopper 20 and is advantageous under conditions of extreme vibration, shock or acceleration. The transistor does not present the same effectively infinite impedance in the control circuit during the gating half-cycle of the amplifier as does the chopper 20 and therefore the response time of the amplifier will deteriorate slightly.

Figure 3:
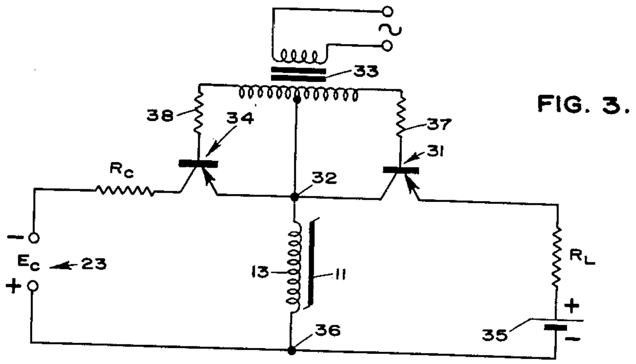
FIG. 3 is a schematic diagram of another embodiment of the invention wherein power is delivered to a load by a direct current source.

Proceeding now to FIG. 3 there is shown a single core self-saturating amplifier capable of controlling the flow of power from a direct current source to a load. The amplifier here comprises a saturable core 11, similar to the core 10 of FIG. 1 but having only a single winding 13 thereon. Hence this embodiment of the invention provides power gain but no voltage gain. The collector electrode of a first transistor 31 is connected to the upper end 32 of winding 13 whence connection is also made to a center tap on the secondary of a transformer 33 and to the emitter electrode of a second transistor 34. The emitter electrode of transistor 31 is connected through a load resistor $R_L$ to the positive terminal of a battery 35 or other suitable direct current power source. The negative terminal of battery 35 is connected to the lower end 36 of coil 13 to complete the amplifier gate circuit.

A source of direct control voltage is connected at the terminals $E_C$ so as to apply, through a suitable resistor $R_C$, a negative potential to the collector electrode of transistor 34. The lower end 36 of coil 13 is directly connected to the positive terminal of the source of control voltage. It will be seen that the power source and control voltage source are polarized so as to drive currents through coil 13 in opposite directions.

Opposite ends of the secondary of a transformer 33 are connected through resistors 37 and 38 to the base electrodes of transistors 31 and 34. When the primary of transformer 33 is excited by an alternating current of suitable frequency, transistors 31 and 34 will be rendered alternately conductive and non-conductive in synchronism with the applied alternating current. The secondary voltage of transformer 33, measured from the center tap to one end of the secondary is greater than the voltage of battery 35 but not of sufficient magnitude to cause breakdown between the collector and base electrodes of transistor 31. Thus during the half-cycle of primary current when the voltage applied to the base transistor 31 is positive with respect to the transformer center tap, transistor 31 will be rendered non-conductive while transistor 34, having the opposite polarity of base voltage, will conduct allowing the control voltage to reset core 11. In the next half-cycle with the polarities of their base voltages reversed, the states of transistors 31 and 34 are reversed with transistor 31 conducting and transistor 34 non-conducting. Current can then flow through the load in an amount determined by the magnetization level of core 11. Thus the amplifier of FIG. 3 provides the advantages of cyclically switched control and gate windings permitting fast response and provides the additional advantages of power amplification from direct current sources.

Obviously many modifications and variations of the present invention are possible in the light of the above teachings. It is therefore to be understood that within the scope of the appended claims, the invention may be practiced otherwise than as specifically described.

What is claimed is:

1. A magnetic amplifier, comprising a core composed of saturable magnetic material and having thereon a gate winding and a control winding, a load connected to said gate winding, an alternating current power source connected to said gate winding and said load, rectifier means for periodically interrupting current flow from said power source through said gate winding and said load, and a control circuit consisting solely of a direct current control voltage source connected to said control winding, and an electro-mechanical synchronous chopper responsive to said power source connected to said control voltage source and said control winding for applying said control voltage to said control winding only during the intervals of interruption of current flow to said load.

2. A magnetic amplifier comprising a core composed of saturable magnetic material, a gate winding and a control winding on said core, a load connected to said gate winding, a diode connected in series with said gate winding and said load to limit current flow through said load and said gate winding to a single direction, an alternating current power source connected in series with said gate winding, said load and said diode, and a control circuit consisting solely of a direct current control voltage source connected to said control winding, and a switching transistor synchronized with said alternating current power source, said switching transistor being arranged to apply to said control winding, during periods of non-conduction of said diode, a control voltage of such polarity as to reverse the magnetization of said core resulting from conduction of current in said gate winding, said control winding and control voltage source being electrically isolated from said alternating current power source.

3. A magnetic amplifier comprising a core composed of a saturable magnetic material, a winding on said core, a first transistor having its collector electrode connected to said winding, a load connected to said winding, a load connected to the emitter electrode of said first transistor, a direct current power source connected to said load and said winding so as to circulate current therethrough upon conduction of said first transistor, a second transistor having its emitter electrode connected to said winding and to the collector of said first transistor, a uni-directional control voltage source connected to the collector of said second transistor and said winding and providing a voltage to circulate through said winding upon conduction of said second transistor, a current opposite to the direction of current from said power source, and a transformer applying oppositely phased alternating voltages to said first and second transistors to render one conductive and the other non-conductive in alternation.

References Cited in the file of this patent

UNITED STATES PATENTS

| | | |
|---|---|---|
| 2,773,132 | Bright | Dec. 4, 1956 |
| 2,840,778 | Clarke | June 4, 1958 |
| 2,859,289 | House | Nov. 4, 1958 |
| 2,953,741 | Pittman et al. | Sept. 20, 1960 |
| 2,965,834 | Patton | Dec. 20, 1960 |
| 2,980,846 | Ringelman | Apr. 18, 1961 |
| 2,990,510 | Wright | June 27, 1961 |

OTHER REFERENCES

Pittman: "Transistor Control of Magnetic Amplifiers," February 1954, Radio-Electronic Engineering, pages 13–15.